March 22, 1927.
R. PRUGER
BEARING
Filed Oct. 15, 1923
1,621,751
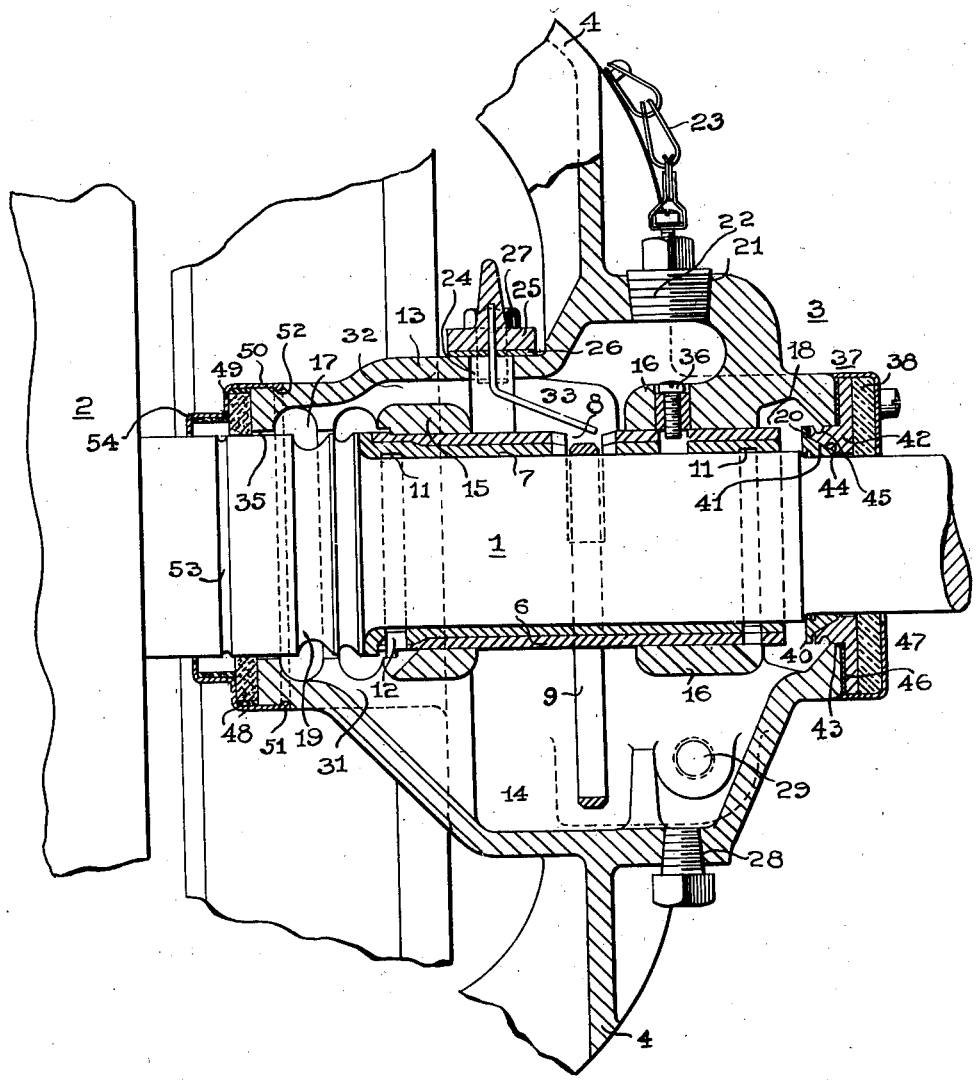
WITNESSES:
R. S. Harrison
S. M. Pineles
INVENTOR
Raoul Pruger
BY
Wesley G. Carr
ATTORNEY Patented Mar. 22, 1927.

1,621,751

UNITED STATES PATENT OFFICE.

RAOUL PRUGER, OF PITTSBURGH, PENNSYLVANIA, ASSIGNOR TO WESTINGHOUSE ELECTRIC & MANUFACTURING COMPANY, A CORPORATION OF PENNSYLVANIA.

BEARING.

Application filed October 15, 1923. Serial No. 668,479.

My invention relates to bearings and it has special relation to oil-lubricated bearings operating in ventilated machines such as dynamo-electric machines.

The general object of my invention is to provide an improved bearing which will substantially prevent the escape of the lubricating oil from the bearing whether in the form of an oil film creeping along the bearing shaft or in the form of oil vapor carried by the air circulating through, and in the neighborhood of, the bearing.

A more specific object of my invention is to provide a sleeve bearing which is so arranged as to prevent the development of large air pressure differences between different portions thereof and thus decrease the tendency of the oil to be sucked towards the portions which are under low pressure.

Another object of my invention is to provide a sleeve bearing for ventilated machines having air-balancing spaces or channels for preventing the development of an excessively low pressure at one end of the bearing.

A further object of my invention is to provide a hermetically enclosed sleeve bearing for preventing the passage of air currents through the openings which are provided for admitting oil to the bearing or for assembling the oil ring, etc.

A still further object of my invention is to provide improved oil-throwing and oil-collecting means for reducing the leakage of oil along the bearing shaft.

A journal bearing having a bearing sleeve surrounding the journal and utilizing oil-ring lubrication has a number of advantages which render it more desirable for general all-round service than a bearing of any other construction. These advantages consist in the simple, inexpensive and rigid construction of the bearing, large bearing surface, capacity to withstand abuse in service, gradual decrease in serviceability, the prevention of a sudden breakdown and permitting ample time for replacement, a comparatively low degree of accuracy required in manufacture, and the simple manner in which the bearing may be reconditioned by babbitting the bearing sleeve.

In the prior construction, however, journal bearings have given considerable trouble on account of the escape of oil from the bearing, partly in the form of an oil-laden atmosphere or foam escaping with the air currents from the bearing, and partly in the form of an oil film creeping along the bearing shaft toward the commutator or other parts of the machine where it might cause considerable damage.

My invention is the result of a long series of tests and developments with the object of producing a sleeve bearing which shall be substantially non-leaking and which shall avoid most of the troubles arising from the above-specified deficiencies.

With the foregoing and other objects in view, my invention consists in the arrangements and details of construction claimed and described hereinafter and illustrated in the accompanying drawing wherein the single figure is a sectional view through a portion of an end bracket and bearing of a dynamo-electric machine.

A shaft or journal 1, of a rotor member 2 of a dynamo-electric machine, is mounted in a bearing 3, constituting a portion of an end bracket 4 of the machine. The bearing 3 comprises a cylindrical bearing sleeve 6 having an inner lining 7 of a soft bearing material like babbitt. A slot 8 is provided in the middle portion of sleeve 6, exposing a portion of the journal for lubricating the same by means of an oiling ring 9 resting upon the journal in a familiar way. In order to prevent the escape of the oil from the journal at the ends thereof, I provide two annular grooves 11 at both ends of the journal with an oil outlet 12 in the lower portion thereof to permit the oil to run off from the journal before it emerges at the ends of the same.

The journal is surrounded by a housing 13, constituting, in its lower portion, an oil well 14 for holding the oil utilized for the lubrication of the bearing. The housing 13 is also provided with two cylindrical seat members 15 and 16, wherein the journal sleeve 6 is seated. The housing is further provided, at both ends thereof, with extensions constituting oil-catching chambers 17 and 18, respectively, surrounding oil thrower grooves or collars 19 and 20, respectively, provided upon the shaft of the machine.

The upper portion of the housing has an opening 21 for admitting oil thereto which may be closed by a threaded pipe plug 22, suspended on a sash-chain 23 secured to the end bracket 4. In order to permit the assembly and removal of the oil ring from the bearing, I provide a transverse slot 24 which is enclosed by means of a slot cover 25. The slot cover 25 is tightly secured upon the slot opening 24 by means of a packing washer 26 and screw bolts 27 in order to provide a hermetical enclosure of the inner space within the housing for reasons explained hereinafter.

The oil well 14 is provided with an ordinarily closed oil drain opening 28 and a similarly closed oil overflow opening 29 for preventing the introduction of an excessive quantity of oil during the filling operation. While I have described the opening 21 as a filling opening and the opening 29 as an overflow opening, I do not wish to imply, by such description, that the latter opening may not be utilized as the filling opening, if so desired. The oil outlets 12 of the sleeve journal and the oil-catching chambers 17 and 18, respectively, communicate at their bottom portions with the oil well 14 and permit the collected oil to flow back into the oil well.

In prior bearing constructions, it has often occurred that the blower action of the rotor 2 produced a partial vacuum around the portion of the shaft adjacent to the bearing journal 1 at the inner end thereof. Under such circumtsances, the oil was very often drawn from the oil well 14 into the oil-catching chamber 17, entirely sealing off the communicating opening 31 between the oil-catching chamber and the oil well, and aggravating still further the trouble arising from the blower action. The lower pressure in the oil-catching chamber 17 also caused the oil film upon the journal to be sucked toward the armature 2.

I have found that the above described sucking action of the blower constitutes a source of constant annoyance and danger in the operation of dynamo-electric machines and has a very undesirable effect upon the usefulness of journal bearings in such apparatus. In order to avoid the above difficulties, I provide, among other things, communicating passages 32 between the central chamber 33 of the bearing housing and the oil-catching chamber 17 at the inner end thereof, the communicating passages being of sufficient size and arranged well above the oil level, preferably in the upper portion of the bearing housing, for securing a balanced pressure between the inner and middle portion of the bearing housing under all circumstances, and preventing the development of large pressure differences in the several parts thereof.

In order that the communicating channels 32 may accomplish the desired purpose of balancing the air pressures, and also because of the difficulties in making very small openings in the cast bearing housing, the air channels 32 must be of fairly large size and constitute a new source of difficulty on account of the air currents which are thus drawn through the entire bearing by the blower action of the rotor 2. Under such circumstances, a considerable amount of air might be drawn through the housing, entering either by way of the oil-ring slot 24, or through the filling hole 21, passing through the channels 32 and reaching the motor through the bore clearance 35 at the end of the housing. Since the oiling-ring causes considerable agitation of the oil and, furthermore, since the high bearing temperature tends to vaporize some of the oil, the air which passes through the housing will carry the oil fog or vapor into the machine.

I have found that I may almost entirely prevent such undesirable air currents through the housing by hermetically closing all openings leading into the interior of the housing and it is to this end that the oil-slot cover 25 is hermetically secured over the oil-slot opening 24 and that the filling hole 21 is similarly closed by means of the threaded plug 22.

The journal sleeve 6 is held in a fixed position by means of a steadying screw 36 extending through the seat member 16 and disposed directly under the filling hole 21, within the interior of the housing, permitting the adjustment of the screw through the filling hole. The above arrangement eliminates the leakage of oil which often results from the fact that the steadying screw passes through to the exterior of the housing.

As a further means for reducing the amount of oil leaking from the bearing, I provide the outer end of the bearing with an improved oil-throwing arrangement 37 and an oil-wiping device 38.

The oil-thrower 37 comprises a collar 20 which is clamped upon the shaft 1 at the outer end of the bearing sleeve and which is provided with a flat annular oil-throwing portion 40 and an adjoining conical surface 41 which slopes down towards the shaft. A sleeve 42 is secured within the housing bore or opening 43 and is provided with a conical inner surface 44 bearing against the conical surface 41 of the oil-throwing collar 20. The sleeve 42 also has an outer surface which is provided with an oil-collecting groove 45 for collecting the oil which drips from the walls of the oil-catching chamber 18 surrounding the oil-throwing collar. The walls of the upper portion of the chamber are preferably so sloped toward the bore 43 of the housing that the oil runs down to the oil-collecting groove 45.

As far as I am aware, it has not been recognized heretofore that a considerable amount of the oil leakage in prior structures has resulted from the fact that a large part of the oil which is thrown off by oil throwers runs down along the upper walls of the oil-catching chambers and drips back upon the shaft portion which is beyond the oil throwers, proceeding thereupon along the shaft without further hindrance. The oil-collecting groove 45 almost entirely eliminates the above-described cause of oil leakage.

The arrangement of the two conical bearing surfaces 41 and 44, respectively, is intended to assist in the prevention of oil creepage along the shaft. The oil or vapor which occasionally may get back upon the portion of the oil-throwing collar 20 that is disposed beyond the oil-throwing portion 40 is drawn out from between the conical bearing surfaces 41 and 44 by reason of the capillary and centrifugal forces acting thereon and is forced back upon the oil-throwing portion 40.

The oil-wiping device 38 comprises a heavy soft felt washer 46 which is fitted upon the shaft and is clamped to the end portion of the housing by means of a cap 47. The main function of the felt washers is to prevent air currents and dust from entering the interior of the housing and to keep oil from running over when filling the bearing.

The inner end of the housing is provided with a similar oil-wiping attachment comprising a plurality of felt washers 48 which are held together by means of a metallic cap 49 having an extending cylindrical portion 50 provided with depressions 51 snapping into a groove 52 upon the outer surface of the housing. The felt washers are pasted to the metal cap 48 and the outer surface of the bearing housing, respectively, by means of shellac for providing a dust-proof joint.

Upon the shaft 1 is also provided an oil-throwing groove 53 which is disposed adjacent to the felt washers 48, on the side toward the armature 2, for throwing off such oil particles as may still emerge upon the shaft. The thrown oil is collected by an oil-catching chamber 54 of special construction comprising a compartment formed by an extension of the cap 49. The inner surface of the compartment is lined with an oil-absorbent material, such as felt for soaking in such oil as may be thrown off from the oil-throwing groove 52. The adopted construction is very simple and prevents the thrown off oil from dripping back upon the shaft. The oil-catching chamber 54 and related parts constitute the subject-matter of my application Serial No. 16,340, filed March 18, 1925, as a continuation in part of the present application.

My improved bearing does not require filling or renewing of oil more than once in three to six months, or even longer time periods, reducing the required attention and the amount of used lubricant. Such performance has been made possible by the fact that the bearing is air-sealed, preventing dust and dirt from entering the same. The oil is thus kept clean and the life of the bearing is prolonged.

The above-described novel features of the illustrated bearing construction have proved instrumental in overcoming the difficulties attendant upon the use of prior sleeve bearing structures in high-speed machines with strong blower action. The novel features of my invention are not, however, limited to such service only, but may be advantageously utilized for many other applications. Similarly, I do not wish to be limited to the precise details and structural forms described and illustrated in the specification but seek to cover, in the appended claims, all those modifications which come within the true scope and spirit of my invention.

I claim as my invention:

1. The combination with a rotating machine having a journal, of a journal bearing comprising a bearing sleeve surrounding said journal and having an oil-supply slot in the upper portion thereof, a hermetically tight housing entirely surrounding said sleeve and comprising a seat member within the housing for holding the sleeve and an oil receptacle disposed beneath said seat member, an oiling ring disposed in said slot and extending into said receptacle for oiling said journal, said housing having a normally hermetically closed opening for providing access to the interior of said housing, a steadying screw extending through said seat member for retaining said bearing sleeve, said steadying screw being accessible for insertion and removal through said hermetically closed opening, said oil-supply slot being offset from said hermetically closed opening, and means for sealing the housing against the ingress and egress of air at both ends.

2. The combination with a rotating machine having a journal, of a journal bearing comprising a bearing sleeve surrounding said journal and having an oil-supply slot in the upper portion thereof, a housing entirely surrounding said sleeve and comprising a seat member for holding the sleeve and an oil receptacle disposed beneath said seat member, an oiling ring disposed in said slot and extending into said receptacle for oiling said journal, said housing having an opening therein, a steadying screw extending through said seat member for retaining said bearing sleeve, said steadying screw being accessible for insertion and removal through said opening, said oil-supply slot being offset from said opening, said housing having a separate opening for removing said oil ring, and means for covering said housing openings.

3. The combination with a rotating machine having a journal, of a journal bearing comprising a bearing sleeve surrounding said journal and having an oil-supply slot in the upper portion thereof, a housing entirely surrounding said sleeve and comprising a seat member for holding the sleeve and an oil receptacle disposed beneath said seat member, an oiling ring disposed in said slot and extending into said receptacle for oiling said journal, said housing having an opening therein, a steadying screw extending through said seat member for retaining said bearing sleeve, said steadying screw being accessible for insertion and removal through said opening, said oil-supply slot being offset from said opening, said housing having a separate opening for removing said oiling ring, and means for covering said housing openings, said machine having an end bracket which joins with said bearing housing at a point intermediate said openings, with said first-mentioned opening on the outside.

4. The combination with a rotating machine having a journal, of a journal bearing comprising a bearing sleeve surrounding said journal and having an oil-supply slot in the upper portion thereof, a housing entirely surrounding said sleeve, seat members in said housing for holding said sleeve in a fixed position, said seat members dividing the space within the housing into a plurality of chambers, an oil receptacle in the lower portion of said housing, an oiling ring resting on said journal within said slot and extending into said oil receptacle, said housing having a communicating channel through an upper portion of said seat members for balancing the air pressure in said chambers, said housing having a filling opening for admitting oil to said receptacle, said housing having a separate slotted opening for removing said oiling ring, the operation of said machine tending to produce air currents through the space within the housing, said filling opening and said slotted opening being so positioned, respectively, as to be relatively accessible and inaccessible, said slotted opening being sealed for reopening at only rare intervals and said filling opening having a relatively easily removable and substantially hermetically tight closure member whereby the ingress or egress of air and oil is substantially prevented during normal operation, and means for impeding the circulation of air through the ends of the bearing between the housing and the shaft.

5. The combination as recited in claim 4, characterized by a steadying pin extending through a portion of said seat members for retaining said bearing sleeve, said steadying pin being accessible for insertion and removal through a normally hermetically closed housing opening whereby any oil or air leaking past said pin is not in communication with the exterior of the housing.

In testimony whereof, I have hereunto subscribed my name this 12th day of October, 1923.

RAOUL PRUGER.